Patented May 14, 1935

2,001,071

UNITED STATES PATENT OFFICE 2,001,071

RUBBER COMPOSITION AND METHOD OF PRESERVING RUBBER

Robert L. Sibley, Nitro, W. Va., assignor to The Rubber Service Laboratories Company, Akron, Ohio, a corporation of Ohio No Drawing. Application September 30, 1932,
Serial No. 635,633

36 Claims. (Cl. 18—50)

The present invention relates to the art of rubber manufacture, and particularly relates to the preparation of rubber compositions which resist deterioration due to aging or to exposure to the atmosphere. It has long been known that such deterioration can be greatly retarded by treating the rubber either before or after vulcanization with certain substances known as age-resisters or antioxidants. The chief object of this invention then is to provide a new and superior class of antioxidants for rubber.

The age resisting characteristics of a vulcanized rubber product can be readily ascertained by subjecting samples of the vulcanized product in a bomb to the action of oxygen under pressure and at an elevated temperature. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending upon the conditions of the test. In all the tests hereinafter set forth, the aging was carried out at a temperature of 70° C. and an oxygen pressure of 300 pounds per square inch.

According to the present invention, a new class of antioxidants or age-resisters has been found which, upon incorporating into a rubber stock imparts exceptional age resisting qualities to the vulcanized rubber product. The compounds herein disclosed as imparting such antioxidant characteristics to vulcanized rubber comprise the sulfur derivatives of a reaction product of a ketone and a primary amine of the benzene series.

For example, the sulfur derivatives of the following ketone amine reaction products are typical members of the class of age resisters outlined above: reaction product of acetone and aniline, reaction product of ortho toluidine and acetone, reaction product of para phenetidine and acetone, reaction product of cyclohexanone and aniline, reaction product of acetone and aniline further treated with hydrochloric acid and neutralized with an alkali as for example sodium hydroxide, reaction product of para amido diphenyl and acetone, reaction product of acetophenone and aniline, reaction product of benzyl amine and acetone, reaction product of para para diamino diphenyl methane and methyl ethyl ketone, reaction product of 2,4 diamino diphenyl amine and acetone, reaction product of para phenylene diamine and mesityl oxide, reaction product of meta phenylene diamine and phorone, reaction product of benzidine and acetone, reaction product of ortho tolidine and diethyl ketone, reaction product of anisidine and benzophenone, reaction product of xylidene and aldol acetone, and analogous materials.

Any one or a mixture of several of the above-enumerated substances or of these substances with other known antioxidants may be incorporated into rubber with good effect on its age-resisting properties.

The following are to be understood as illustrative embodiments of the invention and not limiting of the scope thereof.

Example I 188 parts by weight of aniline, 664 parts by weight of acetone and 7.5 parts by weight of a dehydrating or condensing agent, as for example bromine, were heated in a suitable vessel under pressure for substantially 30 hours at a temperature of substantially 170 to 180° C. The reaction was then allowed to cool and the unreacted acetone and water were removed by distillation at atmospheric pressure. Any unreacted aniline was removed preferably by distillation at reduced pressure. The residual product which it is believed is largely acetone-anil having the probable formula of

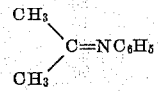

may be reacted with sulfur and employed as an antioxidant. It is preferable, however, that the crude acetone-anil be purified preferably by distillation in which case a light amber colored oil is obtained distilling at substantially 100 to 135° C. at a pressure of 4 mm. of mercury. 75 parts by weight of the purified acetone-aniline product (substantially 12% excess over one-half a mol) and 16 parts by weight of sulfur (one-half an atomic weight portion) were placed in a suitable vessel equipped with an agitator, thermometer and short condenser and heated at substantially 180 to 185° C. until hydrogen sulfide had substantially ceased to be given off. The product thus formed on cooling was a brittle resin melting at substantially 80 to 85° C.

A portion of the reaction product so obtained was then incorporated in the usual manner in a tread stock comprising

- 100 parts of smoked sheet rubber,
- 50 parts of carbon black,
- 5 parts of zinc oxide,
- 3 parts of sulfur,
- 3 parts of stearic acid,
- 2 parts of pine tar,
- 0.8 part of the reaction product of benzoyl chloride and the sodium salt of mercaptobenzothiazole,
- 0.2 part of diphenyl guanidine,
- 1 part of the sulfur derivative of the reaction product of acetone and aniline.

The rubber stock thus compounded was cured by heating in a press in the well known manner and portions of the vulcanized product were then artificially aged by heating in a bomb for 48 hours at a temperature of 70° C. and under a pressure of 300 pounds of oxygen per square inch. A comparison between the aged and unaged vulcanized rubber product is given in Table I.

*Table I*

| Cure | | | Modulus of elasticity in lbs./in.$^2$ at elongations of | | Tensile at break in lbs./in.$^2$ | Ultimate elongation per cent |
|---|---|---|---|---|---|---|
| Mins. | Lbs. steam pressure | Hrs. aged | 300% | 500% | | |
| 60 | 30 | 0 | 1620 | 3505 | 4685 | 640 |
| 60 | 30 | 48 | 1675 | 3090 | 3200 | 510 |
| 75 | 30 | 0 | 1885 | 3770 | 4965 | 635 |
| 75 | 30 | 48 | 1880 | ---- | 3000 | 480 |
| 90 | 30 | 0 | 1910 | 3925 | 4775 | 590 |
| 90 | 30 | 48 | 1800 | ---- | 2975 | 490 |

From the data set forth in Table I it is shown that the preferred class of materials, for example the sulfur derivative of the reaction product of acetone and aniline possesses very efficient antioxidant properties.

The reaction product of acetone and aniline described above has been reacted with sulfur in other ratios than that of substantially one molecular proportion of the former to substantially one atomic weight portion of the latter. Thus substantially one molecular proportion of the reaction product of acetone and aniline has been reacted with 1.25, 1.5, 2 and 6 atomic weight portions of sulfur and the products so formed after incorporation in a tread stock identical with that given above, with the exception of the antioxidant, were found, after aging of the vulcanized rubber stock, to possess antioxidant properties typical of the class.

*Example II*

Substantially one molecular proportion of ortho toluidine-acetone condensation product prepared in a manner analogous to that used in the preparation of the acetone-aniline product described above was heated with substantially one atomic weight portion of sulfur for substantially 11 hours at a temperature of substantially 180 to 185° C. On completion of the reaction, the reaction product comprising a soft resin was incorporated in the well known manner in a rubber stock comprising

- 100 parts of smoked sheet rubber,
- 50 parts of carbon black,
- 5 parts of zinc oxide,
- 3 parts of sulfur,
- 2 parts of pine tar,
- 3 parts of stearic acid,
- 0.8 part of the reaction product of benzoyl chloride and the sodium salt of mercaptobenzothiazole,
- 0.2 part of diphenyl guanidine,
- 1.0 part of the sulfur derivative of the reaction product of ortho toluidine and acetone.

The rubber stock thus compounded was vulcanized and portions of the cured rubber stock aged in the oxygen bomb. The test data obtained on the aged and unaged vulcanized rubber stocks follow in Table II.

*Table II*

| Cure | | | Modulus of elasticity in lbs./in.$^2$ at elongations of | | Tensile at break in lbs./in.$^2$ | Ultimate elongation per cent |
|---|---|---|---|---|---|---|
| Mins. | Lbs. steam pressure | Hrs. aged | 300% | 500% | | |
| 60 | 30 | 0 | 1765 | 3610 | 4540 | 620 |
| 60 | 30 | 48 | 1400 | 2390 | 2495 | 510 |
| 75 | 30 | 0 | 1895 | 3820 | 4660 | 600 |
| 75 | 30 | 48 | 1500 | ---- | 2305 | 470 |
| 90 | 30 | 0 | 1890 | 3890 | 4370 | 580 |
| 90 | 30 | 48 | 1520 | ---- | 2445 | 470 |

*Example III*

Substantially one molecular proportion of para phenetidine-acetone condensation product prepared in a manner analogous to that employed in the preparation of the acetone-aniline product described above was heated with substantially one atomic weight portion of sulfur at a temperature of substantially 180 to 185° C. for substantially 4½ hours. The product thus obtained is a dark colored heavy oil, which was incorporated in a stock identical with that employed in Examples I and II with the exception of the antioxidant. After vulcanization, the cured rubber product was aged. The tensile data for the aged and unaged stocks follow in Table III.

Table III

| Cure | | | Modulus of elasticity in lbs./in.² at elongations of | | Tensile at break in lbs./in.² | Ultimate elongation per cent |
|---|---|---|---|---|---|---|
| Mins. | Lbs. steam pressure | Hrs. aged | 300% | 500% | | |
| 60 | 30 | 0 | 1940 | 3950 | 4665 | 590 |
| 60 | 30 | 48 | 1730 | 3050 | 3210 | 520 |
| 75 | 30 | 0 | 2065 | 4045 | 4590 | 570 |
| 75 | 30 | 48 | 1815 | ---- | 3050 | 490 |
| 90 | 30 | 0 | 1940 | 4010 | 4505 | 575 |
| 90 | 30 | 48 | 1835 | ---- | 2885 | 465 |

Example IV

Substantially equi-molecular proportions of cyclohexanone and aniline were heated for substantially four hours at a temperature of substantially 150° C. in the presence of a suitable catalyst or condensing agent, for example, the zinc chloride aniline addition product. On completion of the reaction, the desired reaction product is isolated from the crude reaction mixture preferably by distillation at reduced pressure. The product thus obtained distilled at substantially 120 to 135° C. at 9 m.m. of pressure. The cyclohexanone-aniline product prepared as described was then reacted with sulfur preferably by heating substantially one molecular proportion of the former with substantially one atomic weight portion of the latter for substantially 4.5 hours at a temperature of substantially 180–185° C. The reaction product comprising a dark heavy oil was incorporated in a stock identical with that employed in Examples I and II, with the exception of the antioxidant, and portions of the cured rubber stock were aged in the oxygen bomb. The test data follow.

Table V

| Cure | | | Modulus of elasticity in lbs./in.² at elongations of | | Tensile at break in lbs./in.² | Ultimate elongation per cent |
|---|---|---|---|---|---|---|
| Mins. | Lbs. steam pressure | Hrs. aged | 300% | 500% | | |
| 60 | 30 | 0 | 2100 | 4260 | 4420 | 515 |
| 60 | 30 | 48 | 1480 | ---- | 2165 | 470 |
| 75 | 30 | 0 | 2110 | 4275 | 4475 | 510 |
| 75 | 30 | 48 | 1535 | ---- | 2180 | 480 |
| 90 | 30 | 0 | 2430 | ---- | 4200 | 485 |
| 90 | 30 | 48 | 1575 | ---- | 2000 | 400 |

Example V

To 100 parts by weight of the acetone-aniline product prepared as in Example I was added 30 parts by weight of 27% hydrochloric acid and the mixture heated to substantially 100° C. for substantially six hours, whereupon, after neutralization with dilute sodium hydroxide solution, washing with water and drying, a solid product was obtained. The exact mechanism of the above reaction is not known. To 50 parts by weight of the product obtained as described 10 parts by weight of sulfur were added and the mixture heated for substantially six hours at a temperature of substantially 180 to 185° C. The product thus obtained comprising a solid was incorporated in a stock identical with that employed in Examples I and II with the exception that the present product was used as the antioxidant. The compounded rubber stock was vulcanized and portions thereof aged. The test data on the aged and unaged stocks follow.

Table IV

| Cure | | | Modulus of elasticity in lbs./in.² at elongations of | | Tensile at break in lbs./in.² | Ultimate elongation per cent |
|---|---|---|---|---|---|---|
| Mins. | Lbs. steam pressure | Hrs. aged | 300 | 500 | | |
| 60 | 30 | 0 | 1970 | 3900 | 4740 | 600 |
| 60 | 30 | 48 | 1420 | ---- | 2065 | 430 |
| 75 | 30 | 0 | 2085 | 4085 | 4785 | 615 |
| 75 | 30 | 48 | 1465 | ---- | 1935 | 420 |
| 90 | 30 | 0 | 1915 | 3910 | 4350 | 550 |
| 90 | 30 | 48 | 1420 | ---- | 1960 | 425 |

Example VI

Substantially one molecular proportion of the reaction product of para amino diphenyl and acetone prepared in a manner analogous to the acetone-aniline condensation product described above and one atomic weight portion of sulfur were heated together in a suitable vessel for substantially 4.5 hours at a temperature of substantially 180 to 185° C. The product thus obtained comprising a brown solid was milled into a stock identical with that given in Examples I and II with the exception that the antioxidant employed was the sulfur derivative of the reaction product of para amino diphenyl and acetone. Aging tests were carried out on the cured rubber product with the results as given in Table VI.

Table VI

| Cure | | | Modulus of elasticity in lbs./in.² at elongations of | | Tensile at break in lbs./in.² | Ultimate elongation per cent |
|---|---|---|---|---|---|---|
| Mins. | Lbs. steam pressure | Hrs. aged | 300% | 500% | | |
| 60 | 30 | 0 | 2110 | 4280 | 4370 | 505 |
| 60 | 30 | 48 | 1815 | ---- | 3060 | 495 |
| 75 | 30 | 0 | 2180 | 4280 | 4390 | 510 |
| 75 | 30 | 48 | 1880 | ---- | 2955 | 475 |
| 90 | 30 | 0 | 2360 | 4320 | 4320 | 500 |
| 90 | 30 | 48 | 1990 | ---- | 2785 | 445 |

Example VII

Substantially one molecular proportion of acetophenone and a slight excess over one molecular proportion of aniline were heated together at substantially 200° C. at atmospheric pressure until the reaction was substantially completed. After the heating was completed any unreacted ingredients were removed preferably by distillation. The residual product remaining thereafter comprises the acetophenone-aniline condensation product. To substantially one molecular proportion of said acetophenone-aniline condensation product was added substantially one atomic weight portion of sulfur and the mixture heated for substantially 15 hours at a temperature of 180 to 185° C. The reaction product so obtained comprising a dark colored semi solid was also incorporated in the typical tread stock set forth in Examples I and II, substituting the present material for the antioxidant employed in those examples. After vulcanization portions of the stocks were aged. A comparison between the tensile and modulus characteristics of the aged and unaged cured rubber stocks follow in Table VII.

Table VII

| Cure | | | Modulus of elasticity in lbs./in.² at elongations of | | Tensile at break in lbs./in.² | Ultimate elongation per cent |
|---|---|---|---|---|---|---|
| Mins. | Lbs. steam pressure | Hrs. aged | 300% | 500% | | |
| 60 | 30 | 0 | 2235 | 4370 | 4660 | 525 |
| 60 | 30 | 48 | 1620 | ---- | 2500 | 480 |
| 75 | 30 | 0 | 2195 | 4245 | 4580 | 530 |
| 75 | 30 | 48 | 1640 | ---- | 2310 | 445 |
| 90 | 30 | 0 | 2320 | 4350 | 4350 | 500 |
| 90 | 30 | 48 | 1655 | ---- | 2200 | 425 |

Example VIII

Substantially 98 parts by weight of para para diamino diphenyl methane and substantially 664 parts by weight of acetone were heated together in a suitable reactor under pressure for substantially 20 hours at a temperature of 170 to 180° C. in the presence of a suitable catalyst or condensing agent, for example 3.8 parts by weight of bromine. Any unreacted material together with the water formed by the reaction was removed from the reaction product preferably by distillation. The residue comprising the reaction product of para para diamino diphenyl methane and acetone was added to sulfur in the ratio of substantially one molecular proportion of the former to substantially one atomic weight portion of the latter and the mixture heated for substantially seven hours at a temperature of substantially 180 to 185° C. The resulting product comprising a brown solid was incorporated in the typical tire tread stock hereinbefore set forth in Examples I and II substituting the present material for the antioxidant employed in those examples. The tensile and modulus data of the aged and unaged cured rubber stocks follow in Table VIII.

Table VIII

| Cure | | | Modulus of elasticity in lbs./in.² at elongations of | | Tensile at break in lbs./in.² | Ultimate elongation per cent |
|---|---|---|---|---|---|---|
| Mins. | Lbs. steam pressure | Hrs. aged | 300% | 500% | | |
| 60 | 30 | 0 | 1980 | 4100 | 4280 | 510 |
| 60 | 30 | 48 | 1345 | ---- | 1905 | 430 |
| 75 | 30 | 0 | 2065 | 4175 | 4295 | 520 |
| 75 | 30 | 48 | 1335 | ---- | 1840 | 360 |
| 90 | 30 | 0 | 2285 | ---- | 4120 | 495 |
| 90 | 30 | 48 | 1490 | ---- | 1850 | 390 |

Example IX

Substantially one molecular proportion of benzyl amine and substantially two molecular proportions of acetone were heated together under pressure for substantially 20 hours at a temperature of substantially 220° C., in the presence of a small proportion of a suitable catalyst or condensing agent for example iodine. Any unreacted amine or ketone was removed from the reaction product preferably by distillation. The solid residue comprising the desired reaction product of benzyl amine and acetone was reacted with sulfur in the ratio of substantially one molecular proportion of the former to substantially one atomic weight portion of the latter by heating a mixture thereof for substantially 6 hours at a temperature of 180 to 185° C. The product obtained comprising a dark resin was incorporated in a tread stock identical with that employed in Examples I and II with the exception that the present antioxidant was employed rather than the antioxidant shown in those examples. A comparison between the modulus and tensile characteristics of the aged and unaged vulcanized rubber stocks is given in Table IX.

*Table IX*

| Cure | | | Modulus of elasticity in lbs./in.$^2$ at elongations of | | Tensile at break in lbs./in.$^2$ | Ultimate elongation per cent |
|---|---|---|---|---|---|---|
| Mins. | Lbs. steam pressure | Hrs. aged | 300% | 500% | | |
| 60 | 30 | 0 | 2090 | 4070 | 4070 | 500 |
| 60 | 30 | 48 | 1565 | ---------- | 2065 | 405 |
| 75 | 30 | 0 | 2260 | 4230 | 4230 | 500 |
| 75 | 30 | 48 | 1815 | ---------- | 2435 | 410 |
| 90 | 30 | 0 | 2235 | ---------- | 4135 | 490 |
| 90 | 30 | 48 | 1845 | ---------- | 2105 | 340 |

From the specific examples hereinbefore set forth, it is shown that rubber compositions containing small proportions of the preferred class of materials markedly resist the deterioration influences due to heat and oxidation. Furthermore, tests carried out in which the preferred class of materials was incorporated in the typical tread stocks hereinbefore set forth have shown such vulcanized rubber stocks to be greatly resistant to tear and cracking when portions thereof have been repeatedly and alternately stretched and the tension removed.

Obviously, practice of the present invention is not limited to the specific compositions given above, such compositions being merely illustrative of the manner of employing the antioxidants or age resisters of this invention. The antioxidants or age resisters may be employed in conjunction with other vulcanizing agents than those specifically disclosed, for this invention is applicable generally to pure rubber or rubber compositions of the most varied nature.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a reaction product of substantially one atomic weight portion of sulfur and substantially one molecular proportion of a reaction product of a primary amine of the benzene series and a ketone.

2. The method of preserving rubber which comprises treating rubber with a reaction product of substantially one atomic weight portion of sulfur and substantially one molecular proportion of a reaction product of a primary mono amine of the benzene series and a ketone.

3. The method of preserving rubber which comprises treating rubber with a reaction product of substantially one atomic weight portion of sulfur and substantially one molecular proportion of a reaction product of a primary mono amine of the benzene series and an aliphatic ketone.

4. The method of preserving rubber which comprises treating rubber with a reaction product of substantially one atomic weight portion of sulfur and substantially one molecular proportion of a reaction product of a primary mono amine of the benzene series and a straight chain aliphatic ketone.

5. The method of preserving rubber which comprises treating rubber with a reaction product of substantially one atomic weight portion of sulfur and substantially one molecular proportion of a reaction product of a primary mono amine of the benzene series and acetone.

6. The method of preserving rubber which comprises treating rubber with a reaction product of substantially one atomic weight portion of sulfur and substantially one molecular proportion of a reaction product of aniline and an aliphatic ketone.

7. The method of preserving rubber which comprises treating rubber with a reaction product of substantially one atomic weight portion of sulfur and substantially one molecular proportion of a reaction product of aniline and acetone.

8. The method of preserving rubber which comprises treating rubber with a product obtained by heating sulfur and acetone-anil at a temperature of substantially 180° C. to 185° C.

9. The method of preserving rubber which comprises treating rubber with the reaction product of substantially one molecular proportion of acetone-anil and substantially one atomic weight portion of sulfur.

10. The method of preserving rubber which comprises treating rubber with the reaction product of substantially one molecular proportion of a para phenetidine-acetone condensate and substantially one atomic weight portion of sulfur.

11. A composition comprising rubber and a reaction product of substantially one atomic weight portion of sulfur and substantially one molecular proportion of a reaction product of a primary amine of the benzene series and a ketone.

12. A composition comprising rubber and a reaction product of substantially one atomic weight portion of sulfur and substantially one molecular proportion of a reaction product of a primary mono amine of the benzene series and a ketone.

13. A composition comprising rubber and a reaction product of substantially one atomic weight portion of sulfur and substantially one molecular proportion of a reaction product of a primary mono amine of the benzene series and an aliphatic ketone.

14. A composition comprising rubber and a reaction product of substantially one atomic weight portion of sulfur and substantially one molecular proportion of a reaction product of a primary mono amine of the benzene series and a straight chain aliphatic ketone.

15. A composition comprising rubber and a reaction product of substantially one atomic weight portion of sulfur and substantially one molecular proportion of a reaction product of a primary mono amine of the benzene series and acetone.

16. A composition comprising rubber and a reaction product of substantially one atomic weight portion of sulfur and substantially one molecular proportion of a reaction product of aniline and an aliphatic ketone.

17. A composition comprising rubber and a reaction product of substantially one atomic weight portion of sulfur and substantially one molecular proportion of a reaction product of aniline and acetone.

18. A composition comprising rubber and a product obtained by heating sulfur and acetone-anil at a temperature of substantially 180° C. to 185° C.

19. A composition comprising rubber and the reaction product of substantially one molecular proportion of a para phenetidine-acetone condensate and substantially one atomic weight portion of sulfur.

20. A composition comprising rubber and the reaction product of substantially one molecular proportion of acetone-anil and substantially one atomic weight portion of sulfur.

21. The vulcanized rubber product prepared by heating rubber and sulfur in the presence of a reaction product of substantially one atomic weight portion of sulfur and substantially one molecular proportion of a reaction product of a primary amine of the benzene series and a ketone.

22. The method of preserving rubber which comprises treating rubber with one member of a group of compounds consisting in the reaction product of substantially one atomic weight portion of sulfur and substantially one molecular proportion of the reaction products of acetone and aniline, acetone and ortho toluidine, acetone and para phenetidine, cyclohexanone and aniline, acetone and aniline acid treated, heated and neutralized, acetone and para amino diphenyl, acetophenone and aniline, acetone and p,p diamino diphenyl methane and acetone and benzyl amine respectively.

23. The vulcanized rubber product prepared by heating rubber and sulfur in the presence of one member of a group of compounds consisting in the reaction product of substantially one atomic weight portion of sulfur and substantially one molecular proportion of the reaction products of acetone and aniline, acetone and ortho toluidine, acetone and para phenetidine, cyclohexanone and aniline, acetone and aniline acid treated, heated and neutralized, acetone and para amino diphenyl, acetophenone and aniline, acetone and p,p, diamino diphenyl methane and acetone and benzyl amine respectively.

24. The method of preserving rubber which comprises treating rubber with the sulfur derivative of a condensation product of an alkoxy substituted aromatic primary amine and an unsubstituted aliphatic ketone.

25. The method of preserving rubber which comprises treating rubber with the sulfur derivative of a condensation product of an alkoxy substituted aromatic primary amine and acetone.

26. The vulcanized rubber product prepared by heating rubber and sulfur in the presence of the sulfur derivative of a condensation product of an alkoxy substituted aromatic primary amine and an unsubstituted aliphatic ketone.

27. The vulcanized rubber product prepared by heating rubber and sulfur in the presence of the sulfur derivative of a condensation product of an alkoxy substituted aromatic primary amine and acetone.

28. The method of preserving rubber which comprises treating rubber with a reaction product of a primary amine of the benzene series and a ketone, further reacted with sulfur by heating at a temperature of substantially 180° C. to 185° C.

29. The method of preserving rubber which comprises treating rubber with a reaction product of a primary mono amine of the benzene series and a ketone, further reacted with sulfur by heating at a temperature of substantially 180° C. to 185° C.

30. The method of preserving rubber which comprises treating rubber with a reaction product of a primary mono amine of the benzene series and a straight chain aliphatic ketone, further reacted with sulfur by heating at a temperature of substantially 180° C. to 185° C.

31. The method of preserving rubber which comprises treating rubber with a reaction product of aniline and acetone, further reacted with sulfur at a temperature of substantially 180° C. to 185° C.

32. A composition comprising rubber and a reaction product of a primary amine of the benzene series and a ketone, further reacted with sulfur by heating at a temperature of substantially 180° C. to 185° C.

33. A composition comprising rubber and a reaction product of a primary mono amine of the benzene series and a ketone, further reacted with sulfur by heating at a temperature of substantially 180° C. to 185° C.

34. A composition comprising rubber and a reaction product of a primary mono amine of the benzene series and a straight chain aliphatic ketone, further reacted with sulfur by heating at a temperature of substantially 180° C. to 185° C.

35. A composition comprising rubber and a reaction product of aniline and acetone, further reacted with sulfur by heating at a temperature of substantially 180° C. to 185° C.

36. The vulcanized rubber product produced by heating rubber and sulfur in the presence of a reaction product of a primary amine of the benzene series and a ketone, further reacted with sulfur by heating at a temperature of substantially 180° C. to 185° C.

ROBERT L. SIBLEY.